INVENTOR.
MAURICE G. KNOY
BY
ATTORNEYS

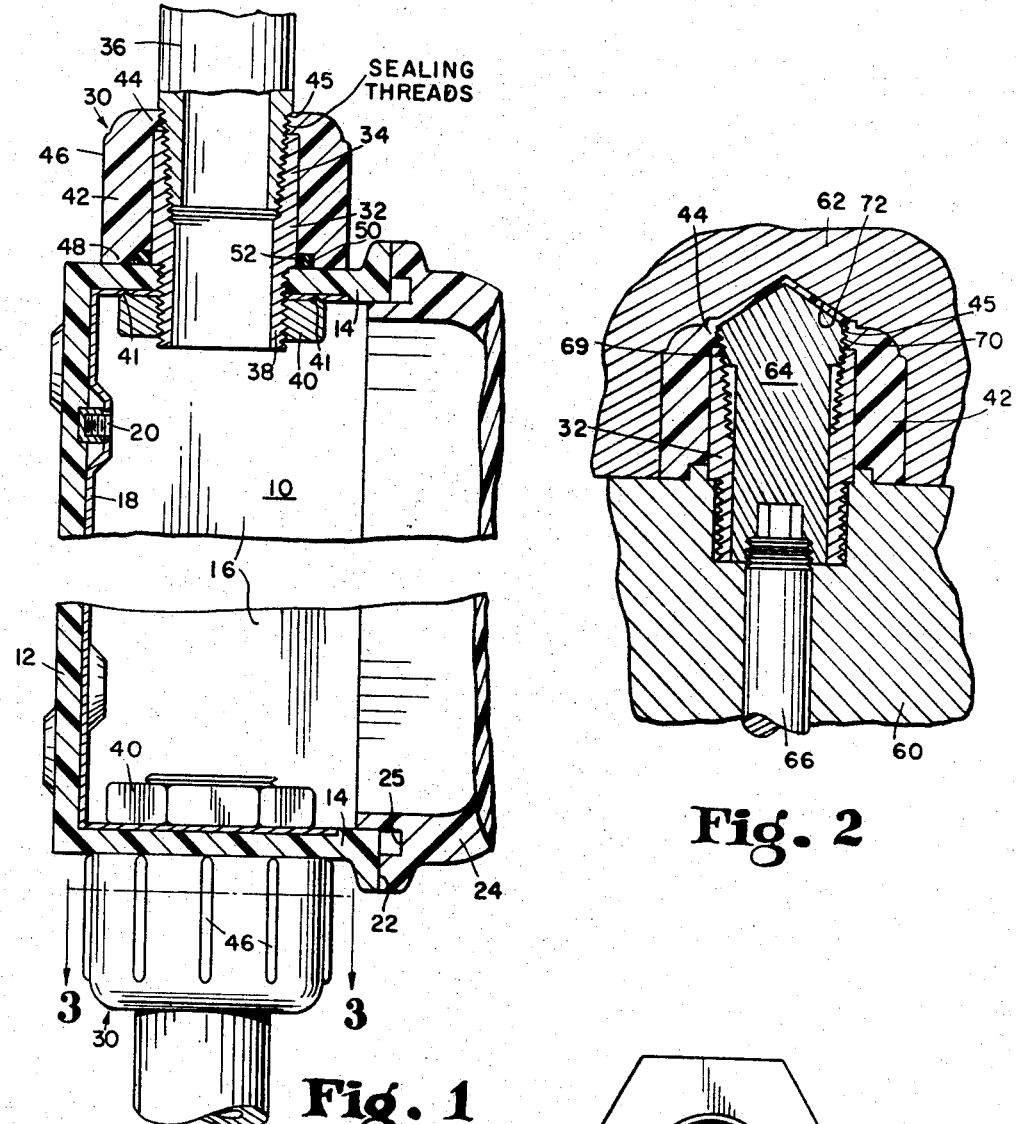

United States Patent Office 3,415,942
Patented Dec. 10, 1968

3,415,942
CORROSION-RESISTANT CONDUIT CONNECTOR
Maurice G. Knoy, Lafayette, Ind., assignor to Rostone Corporation, Lafayette, Ind., a corporation of Indiana
Filed Dec. 27, 1966, Ser. No. 604,669
11 Claims. (Cl. 174—51)

ABSTRACT OF THE DISCLOSURE

A corrosion-resistant connector for connecting electrical conduit to a corrosion-resistant housing, and meeting U.L. standards, has a molded plastic body sealed to both the conduit and the housing, and contains a reinforcing insert, as of metal, surrounding its internally threaded section, to sustain bursting stress. The metal insert may have conduit-engaging threads and provide an electrical grounding connection therefrom through a nipple to the interior of the housing.

Background of the invention

This invention relates to a coupling or connector for connecting an electrical conduit to an electrical box or housing such as is used for housing electrical switches, motor starters, and other electrical equipment, and especially to a corrosion-resistant connector for use with a corrosion-resistant box or housing.

In certain applications, notably in certain food processing plants and in dairies, the environment and conditions are highly corrosive to electrical equipment, and such equipment is desirably housed in corrosion-resistant housings. My new connector is adapted for use with any conventional corrosion-resistant housing, but is especially adapted and intended for use with a molded plastic housing having an electrically conductive metal inlay on its inner surfaces to form a grounding path from one conduit to another connected to the box and/or to a grounded electrical device mounted in the box.

It is the general object of the invention to provide a conduit connector which will be highly resistant to corrosion and may be sealed both to the conduit and to the housing so that it combines with the conduit and housing to provide a sealed system. It is a further object of the invention to provide a conduit connector which has the strength necessary to serve its intended purposes, and particularly to meet the strength standards required by Underwriter's Laboratories, Inc., for connectors which receive its approval. It is a further object of the invention to provide such a connector which has a temperature stability and flame resistance sufficient to meet the requirements of Underwriter's Laboratories. It is a further object of the invention to provide a conduit connector in which all surfaces exposed to the surrounding atmosphere will be of molded plastic composition, that is, synthetic resin, and hence substantially noncorrosive, which connector will have adequate dimensional stability and electrical properties, and will sustain the working forces imposed on it in the assembly and operation of the electrical system. It is a further object of the invention to provide an electrical connector which will provide an electrical grounding connection between the conduit and a grounded portion of the box, such as the grounding metal inlay of the plastic box referred to above.

Summary of the invention

In accordance with the invention, a conduit connector is formed by molding a plastic or synthetic resin body, desirably of thermo-setting material, about a reinforcing insert; and the molded body is formed at its conduit end to be sealed to the connected conduit, and at its box end to be sealed to the wall of the electrical box. In a preferred construction, an insert of metal defines the inner wall of the connector and carries threads by which the connector is joined to the conduit and secured to the electrical box. The molded plastic body of the connector extends beyond the end of the metal insert and is arranged to make sealing engagement with the conduit. In a preferred cnstruction, the outer end of the molded body forms a short length of threads designed to sealingly engage the threads of the conduit.

At the box end, the molded body desirably makes abutting engagement with the side wall of the box or housing, and is provided with a gasket groove which is disposed either wholly or partly outward of the metal insert and which receives a gasket to form a seal between the plastic body of the connector itself and the corrosion-resistant surface of the electrical box. The metal insert is provided with, or threaded onto, a metal nipple which extends through an aperture in the electrical box and receives a retaining nut on its inner end to secure the connector to the wall of the box.

In the preferred construction, a grounding connection with the conduit is made by engagement of the conduit threads with the metal insert, and the nipple and its retaining nut serve to continue the grounding path to the inner wall of the electrical box or housing, for example, to the metal inlay of the plastic box referred to above. If a grounding connection between the conduit and the box is not necessary, the feature of metal to metal threaded engagement between the conduit and the insert may be omitted, and the metal insert may serve only for reinforcing purposes and threads may be formed on the molded body itself for connection to the conduit and to the box.

The drawings

The accompanying drawings illustrate the invention and show a preferred embodiment and certain modifications.

In such drawings:

FIG. 1 is a longitudinal section of an electrical box or housing connected at its top and bottom end walls to conduits by means of connectors embodying the present invention;

FIG. 2 is a somewhat diagrammatic view showing a means for making the conduit connector shown in FIG. 1;

FIG. 3 is a horizontal sectional view taken on the line 3—3 of FIG. 1;

FIG. 4 is a view similar to FIG. 3 showing an alternative external configuration for the connector of FIG. 1;

The preferred embodiments

Figure 5:
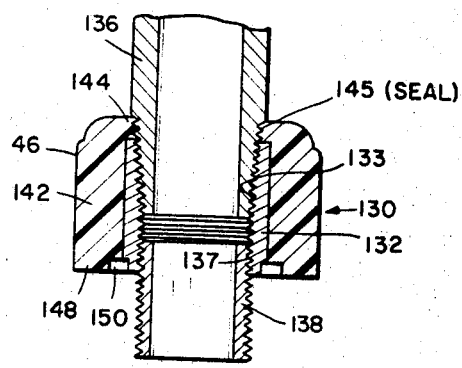
FIG. 5 is a longitudinal sectional view of a modified connector embodying the invention wherein the nipple of the connector is a separate piece.

The apparatus shown in FIG. 1 comprises an electrical housing or box 10 having a bottom wall 12, end walls 14 and interconnecting side walls 16. The inner surface of the bottom wall 12 and end walls 14 contains a grounding metal inlay 18 which desirably extends to the bosses surrounding threaded inserts 20 provided for mounting an electrical device in the box 10, in order to make grounding connection with electrical components mounted against such bosses. The front edge of the box 10 is provided with a reinforcing bead and a front seal face 22 adapted to receive in sealing engagement a suitable cover member 24 which contains a groove 25 for the reception of a sealing gasket between the cover 24 and the front face 22 of the box 10.

Each end wall of the box 10 contains an aperture for the reception of a conduit connector 30. This comprises a metal insert 32 having an outer portion 34 which is internally threaded to receive a conduit 36, and an inner nipple portion 38 which extends through the aperture in the wall 14 and is externally threaded for the reception of a retaining nut 40. The outer surface of the outer portion 34 of the metal insert 32 is knurled or otherwise shaped or treated to make bonding engagement with a plastic body 42 molded about it.

The outer or conduit-end of the molded body 42 extends beyond and inward over the end of the metal insert 32, into engagement with the threads of the conduit 36. The conduit-receiving threads in the metal insert 32 are conventional standard pipe threads, having a tapered configuration. The threads 45 in the overlying portion 44 of the molded body 42 are preferably modified from the conventional standard tapered pipe threads, and are designed to produce a sealing engagement between the plastic material of the body 42 and the surface of the conduit 36. This sealing engagement may be obtained by making the threads in the plastic portion 44 of undersized pitch diameter and/or lead, or of slightly modified shape so that a controlled interference fit is obtained between the threads 45 on such plastic portion 44 and the conduit 36.

The arrangement is such that the threaded engagement of the conduit 36 with the metal threads of the insert 32 provides the necessary physical strength and relationship required in the use of the connector or by applicable standards, while the threads 45 provide a seal. For example, the Underwriter's Laboratories standards require a minimum number of threads in engagement and require the connector to be threaded onto the conduit with a torque of at least 800 in./lb. The metal insert 32 is designed to withstand the bursting forces produced by engagement of tapered pipe threads under this torque, and the molded body 42 need only provide sufficient strength to apply such torque to the connector 30.

For the application of such torque, the outer periphery of the molded body 42 may be provided with a series of ribs 46 shown on the connector 30 at the bottom of FIG. 1 and shown in section in FIG. 3. Such ribs may be designed to shear off when a torque substantially greater than 800 in./lbs. is applied to the connector 30 by a tool gripping that external surface of the body 42, to prevent application of excessive torque to the connector 30.

The inner or box end of the molded body 42 is formed to define an outer rim 48 which makes abutting engagement with the outer surface of the end wall 14 of the box 10. Inwardly of such rim 48, the connector 30 is provided with an annular groove 50 for the reception of a sealing gasket 52. While the groove 50 may extend in part into the material of the metal insert 32, at least a major portion of the groove 50 is defined by the material of the molded plastic body 42 so that the sealing gasket 52 forms a seal between the plastic material of the body 42 and the surface of the box wall 14.

The nipple 38 is of sufficient length to extend through the box wall 14 and to receive the retaining nut 40. Such nut may be a conventional conduit connector nut and desirably is provided with a series of points 41 which cut into the surface of the box wall 14 to insure electrical contact between the nut 40 and the surface of that wall. In the structure shown, the nuts 40 make electrical contact with the grounding metal inlay 18 of the box 10 and thus complete an electrical grounding connection from the conduit 36 through the metal insert 32 and its nipple 38 to the nut 40 and the grounding metal inlay 18. throughthe metal inlay 18 the grounding connection is extended to the mounting bosses surrounding the threaded inserts 20 and extended to the conduit connector and conduit at the opposite end or at some other point in the box 10.

The modified threads 45 for sealing with the conduit 36 may be formed in the end portion 44 of the molded body 42 during the molding of that body 42, by means such as shown in FIG. 2. For purposes of molding, the metal insert 32 is mounted in a lower die 60 which cooperates with an upper die 62 in the compression molding of the molded body 42. The insert 32 is filled with a plug 64 which may be mounted on the end of a knock-out bar 66. The upper end of the plug 64 has a threaded section with one or two threads 69 of standard size engaged in the threads of the insert 32, and additional threads 70 exposed in the mold cavity and modified to produce the desired modified threads 45 on the upper section 44 of the plastic molding 42. The upper end of the plug may be of flat conical shape and may have some clearance from the bottom of the cavity 72 in the upper die 62. The molding operation is carried out in a conventional manner.

The degree of modification of the threads 45 to effect a seal with the conduit threads may be varied in accordance with the properties of the molding compound used. Various molding compounds are available which will produce a connector body which is rigid and strong but which has relatively poor conformability. These may be used for their strength, and the degree of thread interference can be regulated to secure an effective seal without producing excessive stress in the molded body, since the sealing threads will be protected by the main threads in the insert and need serve only the sealing function while the physical stress of the connection will be carried by the main threads in the insert.

Upon completion of the molding operation, the knock-out bar 66 may be elevated to remove the plug and the molded connector 30 from the dies, and this assembly may then be removed from the knock-out bar 66 and replaced by a new plug and insert assembly for a subsequent molding operation. The plug is removed from the molded assembly by unthreading the plug from the internal threads of the metal insert 32, which breaks away the thin upper section of the molding, formed by the clearance space between the plug 64 and the bottom of the cavity 72, to leave a completely molded connector 30. Any rough edge left by the thin upper section may be ground off.

The modification shown in FIG. 5 is like that shown in FIGS. 1 and 2 except that the nipple 138 is a separate piece. The connector 130 comprises a metal insert 132 provided with internal standard pipe threads 133 at its upper end, and with nipple-receiving threads 137 at its lower end. Such insert 132 is used as an insert in the mold during the molding of the plastic body 142 about such insert 132. As in the modification of FIG. 1, the plastic body 142 includes an outer portion 144 which overlies the outer end of the metal insert 132 and is provided with sealing threads 145 to make sealing engagement with the conduit 136.

At its opposite or inner end, the plastic body 142 forms a rim 148 for abutting engagement with the wall of the electrical box and forms inwardly of such rim 148 a sealing gasket-receiving groove 150. A standard nipple 138 is threaded into the inner end of the insert 132, and projects therefrom to extend through an aperture in the wall of the electrical box, in the same manner as shown in FIG. 1.

The external configuration of the modification of FIG. 5 is shown as like that of FIG. 1 and FIG. 3, with a circumferential series of axially extending ribs 43 on its outer periphery. However, the outer configuration of this modification or the modification of FIG. 1, or any other of the modifications shown, may take various other forms. For example, the outer surface may be perfectly round, and the connector may be handled with a strap wrench. In the modification shown in FIG. 4, the outer configuration of the molded body of the connector is hexagonal, to take standard wrenches.

Figure 6:
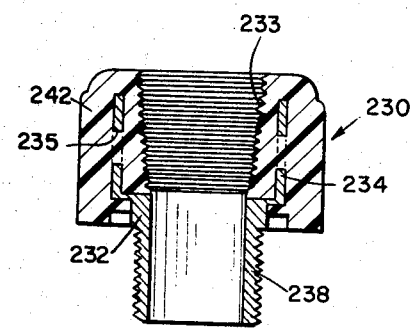
FIG. 6 is a longitudinal sectional view of a further modification wherein the metal insert forms the nipple and the molded body forms the conduit-receiving threads.

The modified connector 230 shown in FIG. 6 comprises a metal insert 232 having a nipple portion 238 and an upper annular portion 234, conveniently in the form of a cylinder perforated with a number of large holes 235. This is used as an insert in molding the plastic body 242, and the size and shape of the cylindrical portion 234 is such that it lies within the mass of the molded body, between the inner and outer peripheries thereof, to act as a reinforcing band in the molded body. Conduit-receiving threads 233 are formed in the upper end of the molded body, and the reinforcing portion 234 surrounds such threads to reinforce the plastic against the bursting forces imposed when the connector is threaded onto the conduit. In this case, the conduit receiving threads are entirely in the plastic portion of the connector and may be substantially in the form of standard taper pipe threads, modified as may be necessary to insure a sealing engagement between the connector and the conduit.

Figure 7:
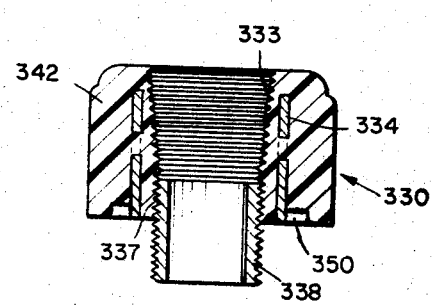
FIG. 7 shows a modification similar to that of FIG. 6 in which the nipple is in a separate piece.

The modification shown in FIG. 7 is similar to that of FIG. 6 except that the metallic insert 334 in the molded plastic body 342 is in the form of a simple cylindrical sleeve containing radial perforations, and the nipple 338 is a separate piece, which may be a conventional pipe nipple, threaded into nipple-receiving threads 337 in the lower portion of the connector 330. The reinforcing sleeve 334 desirably surrounds both the conduit receiving threads 333 and the nipple receiving threads 337 to reinforce the connector against the bursting forces which may be produced when the connector is threaded onto the nipple and the conduit. Conveniently, the reinforcing sleeve 334 extends downwardly to the gasket receiving groove 350 where it is exposed for support in the molding dies.

Figure 8:
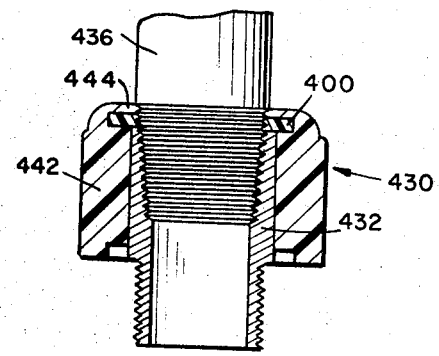
FIG. 8 is a longitudinal sectional view showing a modified electrical connector mounted on a conduit and sealed thereto by a sealing insert.

The modification shown in FIG. 8 is substantially similar to that of FIG. 1 except that the seal to the conduit 436 is obtained by means of a sealing ring insert 400 molded into the connector 430 at the upper end of the metal insert 432, between such upper end and the overlying portion 444 of the molded body 442. The sealing insert may be made of a material, such as nylon, having sufficient plasticity to be deformed into sealing engagement with the threads of the conduit 436 when the connector 430 is threaded onto such conduit. With the use of such sealing insert ring, the outer portion 444 of the molded body may be left unthreaded, or may have standard taper pipe threads, the same as the metal insert 432.

Figure 9:
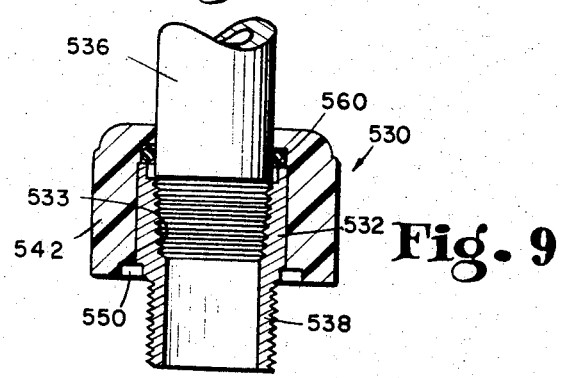
FIG. 9 is a longitudinal sectional view similar to FIG. 8 wherein the sealing insert is beyond the conduit receiving threads and makes its seal against the uninterrupted outer surface of the conduit.

The modification shown in FIG. 9 is also similar to that shown in FIG. 1 except that the seal between the connector 530 and the conduit 536 is obtained by a resilient sealing gasket 560 such as an O-ring, or a molded-in sealing ring, positioned outwardly from the conduit-receiving threads 533 of the connector so that it makes sealing engagement with the outer uninterrupted surface of the conduit 536 beyond the point at which the conduit is disturbed by the threading. This is particularly useful with a coated conduit 536 in that the seal is made between the non-corrosive molded body 542 of the connector and the undisturbed coating on the surface of the conduit 536. In this case, the conduit receiving threads 533 may be wholly contained in the metal insert 532 to make grounding connection between the metal of the conduit 536 with the metal of the insert 532, which grounding connection will be continued by the nipple 538 in the same manner as described in connection with the modification of FIG. 1. At the inner end of the connector, a seal is formed in the same manner as in FIG. 1 by a sealing gasket (not shown) received in the gasket groove 550 surrounding the base of the nipple 538 and formed at least largely in the material of the molded body 542. The connector will provide a continuous sealed connection between the coated surface of the conduit 536 and the non-corrosive outer surface of a corrosion-resistant box 10 such as shown in FIG. 1.

In these various modifications, the metal inserts may be made of any desired material providing the necessary electrical and physical properties.

The molded plastic body portion of the connector may be molded of any of a number of molding compositions which are non-corrosive or which have corrosion-resistant properties. The composition is desirably a thermo-setting material rather than a thermo-plastic material where high heat resistance is required, but may be a thermoplastic material where the heat resistance required lies below the softening temperature of the plastic. The plastic combinders, such as melamine, epoxy, urea, polyester, phenolic, and other known thermo-setting resins; rubber-like compounds such as butyl and other synthetic elastomer compounds; and may comprise various organic thermoplastic binders, such as polyethylene, polypropylene, polyamide, acetal, acrylic, and other known thermoplastic resins. The composition may also include fillers and reinforcing materials, such as glass fiber, asbestos fiber and the like, and other known molding composition components. Where arc-suppressing and/or tracking resistant properties are desired, the composition may include a substantial proportion of hydrated alumina in accordance with U.S. Patent No. 2,768,264, with or without addition compounds as taught in Patent No. 3,242,257. The particular choice of molding compound for molding the plastic body may be made by those skilled in the molding art, and my invention makes it possible to use any of a great variety of molding compounds having high corrosion-resistant properties while meeting the physical and electrical requirements of a conduit connector without imposing on the molded body physical stresses or other conditions exceeding the limits of their properties.

I claim as my invention:

1. A conduit connector comprising:
   a generally cylindrical structure, threaded internally for threaded engagement at one end with a conduit and having means for attachment at its opposite end to another electrical structure,
   such connector having the improvement comprising:
   a molded body of corrosion-resistant plastic material forming the outer surface of the connector from the conduit-receiving opening to the opposite end,
   a reinforcing insert in said molded body, forming a band about the internally threaded portion of the structure to sustain bursting force thereon, and
   sealing means at the opposite ends of the molded body for sealing the same respectively to the conduit and to the other electrical structure.

2. A conduit connector as set forth in claim 1, for connecting a conduit to a housing wall, having a shoulder at such opposite end for support against the housing wall, and adapted to be connected to the housing wall by a nipple extending through an aperture in such wall,
   said molded body forming at least the outer portion of said shoulder,
   said sealing means including means at such shoulder for sealing the molded body to the housing wall.

3. A conduit connector as set forth in claim 1 in which a metal insert forms said band, defines conduit-engaging threads, and extends to the opposite end of the connector for making electrical grounding connection with the other electrical structure.

4. A conduit connector as set forth in claim 1 in which said reinforcing insert is a metal sleeve at the inner periphery of the connector, which is threaded at one end for the reception of the conduit and is threaded at the opposite end for attachment to a nipple or the like, the insert thereby serving to provide an electrical grounding connection from the conduit to the nipple or the like.

5. A conduit connector as set forth in claim 1 in which said connector is internally threaded at both ends and a single reinforcing insert extends longitudinally a sufficient distance to surround the threads at both ends.

6. A conduit connector as set forth in claim 2 in which said reinforcing insert is a metal sleeve integrally connected to a nipple portion extending beyond the shoulder of the molded body for attaching the connector to the housing wall.

7. A conduit connector as set forth in claim 1 in which said sealing means at the conduit end of the connector comprises threads in the molded body beyond the end of the insert and formed to make sealing engagement with the threads of a conduit threaded onto the connector.

8. A conduit connector as set forth in claim 1 in which said sealing means at the conduit end of the connector comprises a conformable sealing ring received in an inwardly-open groove in the molded body.

9. A conduit connector as set forth in claim 8 in which the sealing insert is located beyond the end of the conduit-receiving threads in position to make sealing engagement with the unthreaded surface of the conduit.

10. A conduit connector as set forth in claim 2 in which said sealing means at the housing end of the connector comprises a gasket groove formed in the end face of the shoulder and defined by the molded plastic portion of the shoulder to a sufficient extent that a gasket therein will form a seal between the molded plastic body and the wall to which the connector is mounted.

11. A conduit connector as set forth in claim 10 in which said reinforcing insert is a metal sleeve disposed between the inner and outer peripheries of the molded body, the end of such sleeve being exposed at the inner portion of said gasket groove for support during the molding of the plastic body.

References Cited

UNITED STATES PATENTS 2,580,818   1/1952   Mundy et al. _____ 285—161 X

LARAMIE E. ASKIN, *Primary Examiner.*

D. A. TONE, *Assistant Examiner.*

U.S. Cl. X.R.

174—65; 285—161

PO-1050
(5/69)

UNITED STATES PATENT OFFICE
CERTIFICATE OF CORRECTION

Patent No. 3,415,942   Dated December 10, 1968

Inventor(s) Maurice G. Knoy

It is certified that error appears in the above-identified patent and that said Letters Patent are hereby corrected as shown below:

Column 2, line 8, change "cnstruction" to -- construction --
Column 4, line 3, change "throughthe" to -- Through the --;
Column 6, between lines 16 and 17, insert -- position may comprise various organic thermo-setting --.

SIGNED AND
SEALED

OCT 21 1969

(SEAL)
Attest:

Edward M. Fletcher, Jr.
Attesting Officer

WILLIAM E. SCHUYLER, JR.
Commissioner of Patents